(12) United States Patent
Neibert et al.

(10) Patent No.: US 7,597,295 B2
(45) Date of Patent: Oct. 6, 2009

(54) FURNITURE STABILIZER

(76) Inventors: Paul D. Neibert, 192 Eppinger Dr., Port Charlotte, FL (US) 33953; Lawrence P Neibert, 14059 Ridge Rd., Albion, NY (US) 14411

(*) Notice: Subject to any disclaimer, the term of this patent is extended or adjusted under 35 U.S.C. 154(b) by 0 days.

(21) Appl. No.: 12/318,958

(22) Filed: Jan. 13, 2009

(65) Prior Publication Data

US 2009/0212193 A1 Aug. 27, 2009

Related U.S. Application Data

(60) Provisional application No. 61/064,232, filed on Feb. 22, 2008.

(51) Int. Cl.
*F16M 11/24* (2006.01)

(52) U.S. Cl. .................. 248/188.3; 248/188.5

(58) Field of Classification Search ............. 248/188.3, 248/188.2, 188.4, 188.5, 188.8, 677
See application file for complete search history.

(56) References Cited

U.S. PATENT DOCUMENTS

| | | | |
|---|---|---|---|
| 1,451,999 A | 4/1923 | Perry | |
| 1,973,948 A | 9/1934 | Fogelstrom | |
| 2,384,020 A | 9/1945 | Farson | |
| 2,403,338 A | 7/1946 | Butler | |
| 2,446,127 A | 7/1948 | Cramer | |
| 2,469,425 A * | 5/1949 | Andersen | 248/188.3 |
| 2,836,843 A | 6/1958 | Gallagher, Jr. | |
| 3,036,401 A | 5/1962 | Stark | |
| 3,430,287 A | 3/1969 | Schroeder | |
| 3,722,026 A | 3/1973 | Wilhelmi | |
| 3,828,651 A | 8/1974 | Dorner et al. | |
| 4,798,359 A | 1/1989 | Ball | |
| 5,042,765 A | 8/1991 | Widerstrom | |
| 5,115,723 A | 5/1992 | Wang | |
| 5,344,116 A | 9/1994 | Winkler | |
| 5,613,580 A | 3/1997 | Young | |
| 5,974,985 A | 11/1999 | Flototto et al. | |
| 6,088,877 A | 7/2000 | Swy et al. | |
| 6,186,453 B1 | 2/2001 | Redbone | |
| 6,536,725 B2 | 3/2003 | Fisher | |
| 6,902,140 B1 | 6/2005 | Huang | |
| 7,267,309 B2 * | 9/2007 | Hanson | 248/188.4 |
| 7,287,732 B2 | 10/2007 | Balistreri | |
| 2005/0066472 A1 | 3/2005 | Graham et al. | |
| 2009/0039216 A1 * | 2/2009 | Kwon et al. | 248/188.3 |

* cited by examiner

*Primary Examiner*—Ramon O Ramirez
(74) *Attorney, Agent, or Firm*—Richard C. Litman

(57) ABSTRACT

The furniture stabilizer attaches to furniture legs or other furniture bottom surfaces. The stabilizer has a hollow support tube. A furniture attachment member is attached to the top of the support tube. A floating pin is disposed through an axial bore in a retaining cap at the bottom of the support tube. A helical compression spring fits over the support tube. A stabilizing sleeve extending from a height adjustment collar receives the bottom end of the support tube. The collar is slidably disposed in contact with the compression spring lower end. A housing covers the tube and collar, the housing having a bore disposed at its bottom to allow the collar to protrude. The housing top is attached to the furniture attachment fitting. The floating fastener is attached to the collar to keep the collar in contact with the spring. A footpad or roller attaches to the adjustment collar.

8 Claims, 3 Drawing Sheets

FURNITURE STABILIZER

CROSS-REFERENCE TO RELATED APPLICATION

This application claims the benefit of U.S. Provisional Patent Application Ser. No. 61/064,232, filed Feb. 22, 2008.

BACKGROUND OF THE INVENTION

1. Field of the Invention

The present invention relates to furniture, and particularly to a furniture stabilizer attachable to the legs of a table or other article of furniture to level the surface.

2. Description of the Related Art

Furniture leveling devices are used with chairs, tables, or the like for maintaining balance of the object by correcting for an uneven support structure, e.g. uneven floor, or unevenness in the furniture legs. Shims, support pads and bolts have been used for this purpose. Sometimes the bottom of the furniture article is provided with a plurality of furniture leveling devices, which are secured within corresponding screw holes. To adjust the height of the leveling devices, some of the support pads have to be rotated, which is rather time consuming. For an impatient user, the adjustment of conventional support pads is extremely inconvenient, especially when the furniture piece is used on a very uneven surface.

Thus, a furniture stabilizer solving the aforementioned problems is desired.

SUMMARY OF THE INVENTION

The furniture stabilizer is a spring-biased device that can be attached to furniture legs or the bottom surface of an article of furniture. The device has an elongate hollow support tube. A furniture attachment member is disposed on a top end of the support tube. A floating pin retaining cap is disposed at the bottom end of the support tube. The floating pin is disposed through an axial bore in the retaining cap. A helical compression spring is coaxially disposed over the support tube. The upper end of the spring is in contact with a bottom surface of the furniture attachment fitting. A height adjustment collar has a stabilizing sleeve that receives the bottom end of the support tube. The height adjustment collar is slidably disposed along a longitudinal axis of the support tube, the height adjustment collar being in contact with lower end of the helical compression spring.

A housing envelops the support tube and height adjustment collar, the housing having a bore disposed at its bottom to allow protrusion of the height adjustment collar therethrough. The top of the housing is rigidly attached to the furniture attachment fitting. A bottom part of the floating fastener is attached to the height adjustment collar to keep the height adjustment collar in contact with the compression spring. A footpad is attached to the height adjustment collar. Alternatively, the furniture stabilizer may be supported by a roller.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
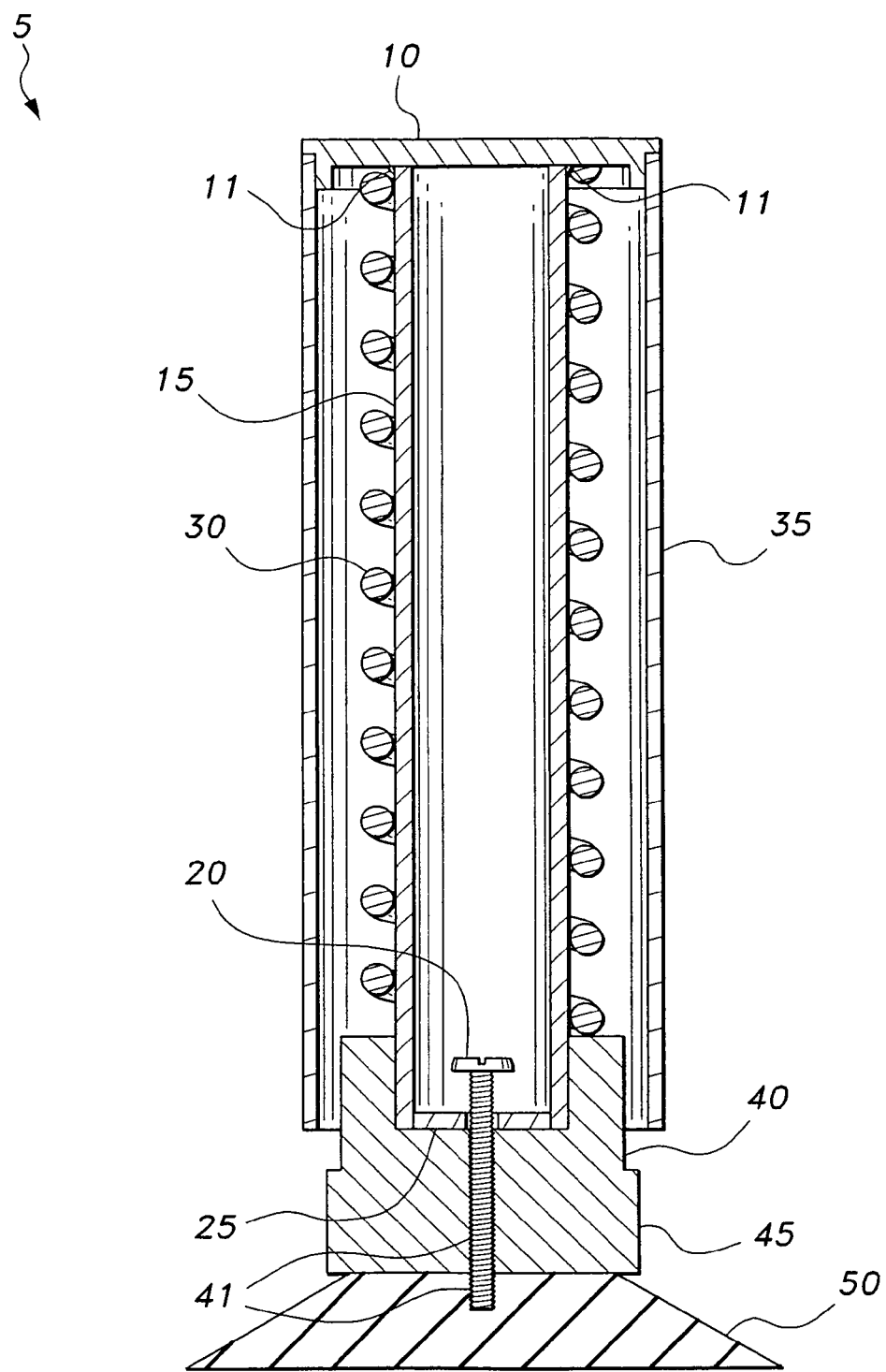
FIG. 1 is an elevation view in section of the furniture stabilizer according to the present invention.
Figure 2:
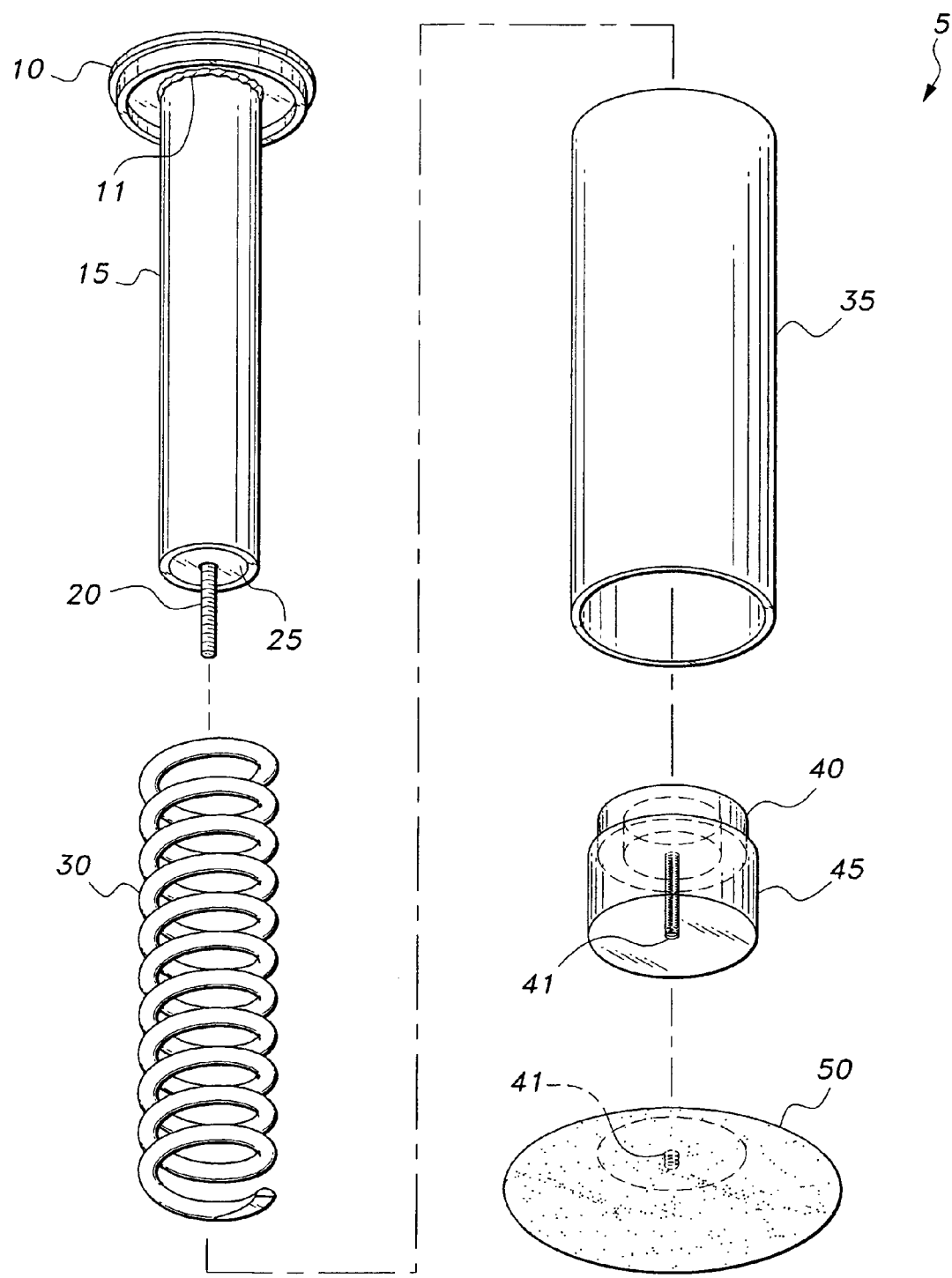
FIG. 2 is an exploded, perspective view of the furniture stabilizer according to the present invention.
Figure 3:
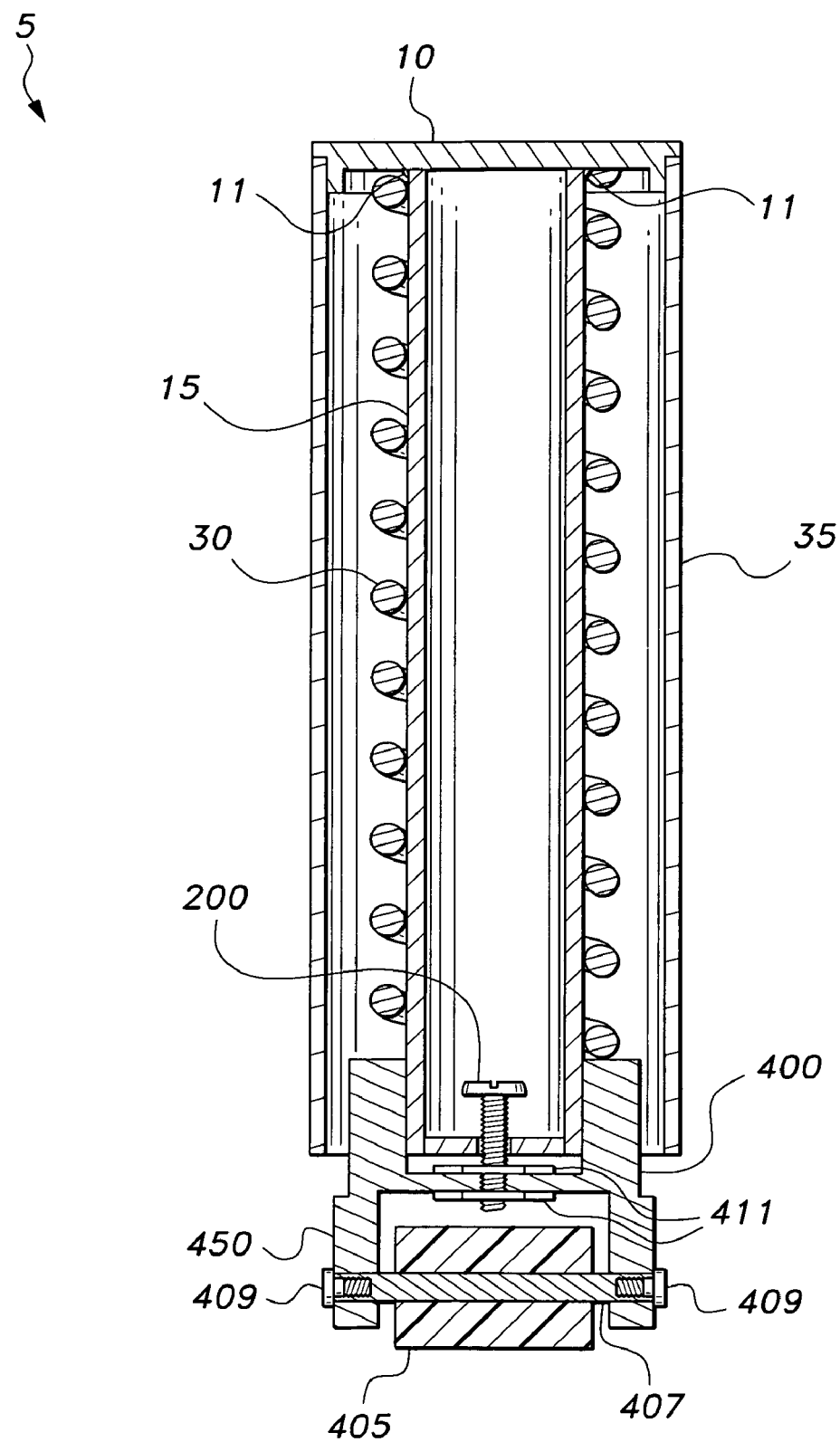
FIG. 3 is an elevation view in section of an alternative embodiment of a furniture stabilizer according to the present invention that includes a low profile roller.

As shown in FIGS. 1-3, the furniture stabilizer 5 is a spring-biased device that can be attached to at least one leg or other bottom surface of an article of furniture, such as a table or the like, to level or otherwise stabilize the furniture. Referring now to FIGS. 1-2, there is seen a furniture stabilizer 5 having an elongate hollow support tube 15 that includes a furniture attachment fitting 10 attached to top end of the support tube 15 via a series of welds 11. The furniture attachment fitting 10 may be a flanged, substantially cylindrical compression member, which allows the attachment member 10 to be compression-fitted inside a bottom leg of the article of furniture.

A floating fastener retaining cap 25 is disposed at the bottom end of the support tube 15. A floating fastener, such as floating pin 20, is disposed through an axial bore in the retaining cap 25. The floating pin 20 may have threads disposed on its shank. However, the shank is dimensioned so that the pin is free to float axially for a predetermined displacement, e.g., ¼ inch, within the floating fastener retaining cap 25. The head of floating pin 20 has a diameter that is wider than a diameter of the axial bore of the retaining cap 25 to keep the pin from escaping the support tube 15.

A helical compression spring 30 is coaxially disposed over the support tube 15, with the upper end of the spring 30 contacting a bottom surface of the furniture attachment fitting 10. The elongate support tube 15 thus constrains lateral movement of spring 30 and holds spring 30 in the illustrated configuration, thereby allowing only axial movement of the spring 30 as it compresses or expands.

A stabilizing sleeve 40 extends from height adjustment collar 45 and receives the bottom end of support tube 15. Preferably, the stabilizing sleeve 40 and height adjustment collar 45 are of unitary construction. The height adjustment collar 45 is slidably disposed along the longitudinal axis of the support tube 15, the stabilizing sleeve 40 being in contact with lower end of the helical compression spring 30, the compression spring lower end bearing against the stabilizing sleeve 40.

A housing 35 or outer casing envelops the support tube 15 and height adjustment collar 45. The height adjustment collar 45 is allowed to protrude through a bore disposed at a bottom of the housing 35. The top of housing 35 is attached by a weld or compression fit to the furniture attachment fitting 10. Threaded holes 41 in the bottom of height adjustment collar 45 and footpad 50 receive fastening threads disposed on the shank of floating pin 20, thereby keeping the stabilizing sleeve 40 of height adjustment collar 45 bearing against the compression spring 30. The footpad 50 is attached to bottom of the height adjustment collar 45.

Referring now to FIG. 3, a low profile roller 405 may take the place of the footpad 50. Lock nuts 411 in the bottom of modified height adjustment collar 450 receive fastening threads disposed on the shank of a shortened floating pin 200, thereby keeping the modified stabilizing sleeve 400 of height adjustment collar 450 bearing against the compression spring 30. Lateral ends of height adjustment collar 450 accept an axle 407 of a low profile, preferably nylon, roller 405. The axle 407 is retained in the bottom of height adjustment collar 450 by axle retaining bolts 409.

When a plurality of assemblies 5 are mounted to the article of furniture, the weight of the furniture over a support surface is distributed among the stabilizers 5 in such a manner that, for even and uneven support surfaces alike, the reactive force of springs 30 forces the footpads 50, or alternatively, the rollers 405, to come in contact with the support surface.

It is to be understood that the present invention is not limited to the embodiment described above, but encompasses any and all embodiments within the scope of the following claims.

We claim:

1. A furniture stabilizer, comprising:
   an elongate hollow support tube having a top end and a bottom end;
   a furniture attachment fitting attached to the top end of the support tube;
   a floating fastener retaining cap disposed at the bottom end of the support tube, the floating fastener retaining cap having an axial bore defined therein;
   a floating fastener disposed through the axial bore in the retaining cap, the floating fastener having a threaded shank, the floating fastener being free to float axially for a predetermined displacement;
   a helical compression spring coaxially disposed over the support tube, the spring having an upper end and a lower end, the upper end being in contact with a bottom surface of the furniture attachment fitting;
   a height adjustment collar having a stabilizing sleeve extending therefrom, the bottom end of the support tube extending into the sleeve, the height adjustment collar being slidably disposed along a longitudinal axis of the support tube, the stabilizing sleeve portion of the height adjustment collar being in contact with the lower end of the helical compression spring, the collar having a bottom with a threaded hole receiving the threaded shank of the floating fastener to keep the height adjustment collar in contact with the compression spring;
   a housing disposed around the support tube and the height adjustment collar, the housing having a bottom having an opening therein allowing the height adjustment collar to extend therethrough, the housing having a top attached to the furniture attachment fitting; and
   a floor-engaging member attached to the height adjustment collar.

2. The furniture stabilizer according to claim 1, wherein the furniture attachment fitting has a flange facilitating attachment of the stabilizer to a bottom leg of an article of furniture.

3. The furniture stabilizer according to claim 1, wherein the floating fastener has a head portion having a diameter wider than the axial bore of the retaining cap, thereby retaining the floating fastener in the support tube.

4. The furniture stabilizer according to claim 1, wherein the height adjustment collar and stabilizing sleeve are of unitary construction.

5. The furniture stabilizer according to claim 1, wherein a top portion of the housing is attached by a weld to the furniture attachment fitting.

6. The furniture stabilizer according to claim 1, wherein a top portion of the housing forms a compression fit with the furniture attachment fitting.

7. The furniture stabilizer according to claim 1, wherein the floor-engaging member comprises a footpad.

8. The furniture stabilizer according to claim 1, wherein the floor-engaging member comprises a roller.

* * * * *